United States Patent [19]

Koerte

[11] 4,307,015
[45] Dec. 22, 1981

[54] AZO COMPOUNDS HAVING A 2-ACYLOXY-, ALKOXY-, SUBSTITUTED ALKOXY-OR HYDROXY-3-ALKYNYLOXY OR SUBSTITUTED ALKENYLOXY-PROPYL GROUP

[75] Inventor: Klaus Koerte, Ettingen, Switzerland

[73] Assignee: Sandoz Ltd., Basel, Switzerland

[21] Appl. No.: 70,762

[22] Filed: Aug. 30, 1979

Related U.S. Application Data

[63] Continuation-in-part of Ser. No. 940,800, Sep. 5, 1978, abandoned.

[30] Foreign Application Priority Data

Sep. 5, 1977 [CH]  Switzerland ........................ 10800/77
Nov. 22, 1977 [CH] Switzerland ........................ 14241/77
Apr. 14, 1978 [CH] Switzerland .......................... 4025/78
Jul. 11, 1979 [CH] Switzerland .......................... 6479/79

[51] Int. Cl.$^3$ .................... C09B 29/08; C09B 29/095; C09B 29/26; D06P 3/36
[52] U.S. Cl. .................................. 260/196; 260/152; 260/157; 260/158; 260/174; 260/178; 260/180; 260/181; 260/186; 260/187; 260/191; 260/197; 260/198; 260/199; 260/200; 260/201; 260/205; 260/206; 260/207; 260/207.5
[58] Field of Search ............... 260/196, 157, 197, 158, 260/198, 187, 200, 152, 201, 187, 205, 191, 206, 186, 207, 174, 207.1, 207.5, 178, 180, 181

[56] References Cited

U.S. PATENT DOCUMENTS

| | | | |
|---|---|---|---|
| 2,323,314 | 7/1943 | Dickey et al. | 260/199 |
| 2,336,275 | 12/1943 | McNally et al. | 260/199 |
| 2,475,228 | 7/1949 | Felix et al. | 260/205 |
| 3,562,789 | 2/1971 | Sasa et al. | 260/207 |
| 3,709,872 | 1/1973 | Koller | 260/207.1 |
| 3,955,919 | 5/1976 | Fujii et al. | 260/207.1 X |
| 4,011,209 | 3/1977 | DeFeo et al. | 260/207.5 |
| 4,082,740 | 4/1978 | Mohr et al. | 260/207.1 X |

FOREIGN PATENT DOCUMENTS

| | | | |
|---|---|---|---|
| 914913 | 5/1968 | Belgium | 260/207.1 |
| 790784 | 2/1973 | Belgium | 260/207.1 |
| 2523269 | 1/1976 | Fed. Rep. of Germany | 260/196 |
| 2709774 | 9/1977 | Fed. Rep. of Germany | 260/196 |
| 1519423 | 2/1968 | France | 260/207 |
| 1534269 | 6/1968 | France | 260/207.1 |
| 44-15310 | 7/1969 | Japan | 260/207.1 |
| 44-15312 | 7/1969 | Japan | 260/207.1 |
| 45-13472 | 5/1970 | Japan | 260/207 |
| 45-34945 | 11/1970 | Japan | 260/207 |
| 47-26652 | 7/1972 | Japan | 260/207 |
| 47-35353 | 9/1972 | Japan | 260/196 |
| 47-37235 | 9/1972 | Japan | 260/207 |
| 47-48882 | 12/1972 | Japan | 260/207 |
| 47-48885 | 12/1972 | Japan | 260/207 |
| 48-17649 | 5/1973 | Japan | 260/207 |
| 49-01866 | 1/1974 | Japan | 260/207 |
| 49-71292 | 7/1974 | Japan | 260/207.1 |
| 51-00236 | 6/1976 | Japan | 260/207 |
| 51-00237 | 6/1976 | Japan | 260/207 |
| 928492 | 6/1963 | United Kingdom | 260/207.1 |
| 985254 | 3/1965 | United Kingdom | 260/196 |
| 1268040 | 3/1972 | United Kingdom | 260/207.1 |

Primary Examiner—Floyd D. Higel
Attorney, Agent, or Firm—Gerald D. Sharkin; Richard E. Vila; Melvyn M. Kassenoff

[57] ABSTRACT

Compounds of the formula

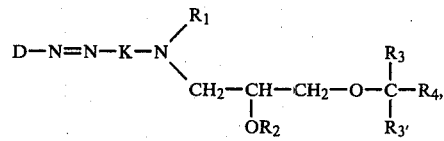

wherein
D is a diazo component radical,
K is the radical of a coupling component of the 1,4-phenylene or 1,4-naphthylene series,
$R_1$ is hydrogen; alkyl; or alkenyl; and when K is a coupling component radical of the 1,4-phenylene series, $R_1$ is also alkenyl monosubstituted by halogen; or alkyl which is substituted by a halogen, hydroxy, alkoxy, acyloxy, phenyl, phenoxy, cyano, alkenyloxy, alkynyloxy or alkoxyalkynyloxy group and is optionally further substituted by a hydroxy group,
$R_2$ is hydrogen, acyl, alkyl or alkyl monosubstituted by halogen, alkoxy, phenyl, phenoxy, benzyloxy, hydroxy or acyloxy and

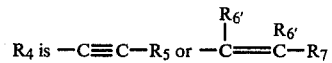

with the proviso that when $R_4$ is

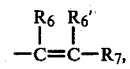

K is a coupling component radical of the 1,4-naphthylene series,
$R_5$ is hydrogen, or

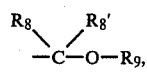

each of $R_3$ and $R_3'$ is independently hydrogen or alkyl, or $R_3$ and $R_3'$ together with the carbon atom to which they are bound form a cyclohexane ring, with the proviso that when $R_3$ and $R_3'$ form a cyclohexane $R_5$ is hydrogen,
one of
$R_6$ and $R_6'$ is hydrogen and the other is hydrogen or halogen,
$R_7$ is hydrogen or alkyl,
each of
$R_8$ and $R_8'$ independently, is hydrogen or alkyl and $R_9$ is hydrogen, acyl, alkyl or alkyl monosubstituted by alkoxy, alkoxyalkoxy or acyloxy, wherein all alkyl and alkoxy moieties contain 1 to 6 carbon atoms, and all alkenyl and alkynyl moieties contain 2–6 carbon atoms, which compounds are useful as disperse dyes for dyeing or printing substrates comprising synthetic or semi-synthetic, hydrophobic, high molecular weight organic textile materials.

31 Claims, No Drawings

AZO COMPOUNDS HAVING A 2-ACYLOXY-, ALKOXY-, SUBSTITUTED ALKOXY-OR HYDROXY-3-ALKYNYLOXY OR SUBSTITUTED ALKENYLOXY-PROPYL GROUP

This application is a continuation-in-part of application Ser. No. 940,800, filed September 5, 1978 and now abandoned.

The present invention relates to azo compounds, their production and use as disperse dyes.

More particularly, the present invention provides azo disperse dyes of formula I,

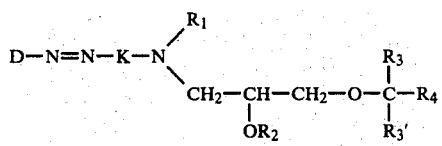

in which
D is a diazo component radical,
K is the radical of a coupling component of the 1,4-phenylene or 1,4-naphthylene series,
$R_1$ is hydrogen; alkyl; or alkenyl; and when K is a coupling component radical of the 1,4-phenylene series, $R_1$ may also be alkenyl monosubstituted by halogen; or alkyl which is substituted by a halogen, hydroxy, alkoxy, acyloxy, phenyl, phenoxy, cyano, alkenyloxy, alkynyloxy or alkoxyalkynyloxy group and is optionally further substituted by a hydroxy group,
$R_2$ is hydrogen, acyl, alkyl or alkyl monosubstituted by halogen, alkoxy, phenyl, phenoxy, benzyloxy, hydroxy or acyloxy,
$R_4$ is

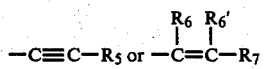

with the proviso that when $R_4$ is

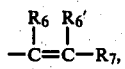

K is a coupling component radical of the 1,4-naphthylene series,
$R_5$ is hydrogen or

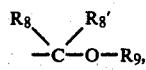

each of $R_3$, and $R_3'$ independently, is hydrogen or alkyl, or $R_3$ and $R_3'$ together with the carbon atom to which they are bound form a cyclohexane ring, with the proviso that when $R_3$ and $R_3'$ form a cyclohexane ring $R_5$ is hydrogen,
one of
$R_6$ and $R_6'$ is hydrogen and the other is hydrogen or halogen,
$R_7$ is hydrogen or alkyl,
each of
$R_8$ and $R_8'$, independently, is hydrogen or alkyl and
$R_9$ is hydrogen, acyl, alkyl or alkyl monosubstituted by alkoxy, alkoxyalkoxy or acyloxy, wherein all alkyl and alkoxy moieties contain 1 to 6, preferably 1 to 4, more preferably (1 or 2 carbon atoms and all alkenyl and alkynyl moieties contain 2 to 6, preferably 2 to 4, more preferably 2 or 3, carbon atoms.

By halogen as used herein is meant chlorine, bromine, fluorine or iodine.

The preferred halogens are chlorine, bromine and iodine, with chlorine and bromine being most preferred.

By acyl as used herein is meant radicals of the formula R—Y— or R'—Y—, in which
R is $C_{1-6}$(preferably $C_{1-2}$)alkyl, halo-$C_{1-6}$—(preferably $C_{1-2}$)alkyl, β- or γ-hydroxypropyl, β, γ-dihydroxypropyl, phenyl, tolyl or benzyl,
X is —O—CO— in which R is bound to the oxygen atom or —SO_2—,
R' is hydrogen or has one of the significances of R,
Y is —CO—, —NR"CO— or —NR"—SO_2— in which R' is bound to the nitrogen atom, and
R" is hydrogen or has one of the significances of R.
Acyloxy is to be understood accordingly.

The diazo component radical D may be any of those common in disperse dyestuffs and may be of the benzene, naphthalene or heterocyclic series, which diazo component radicals are radicals of monoazodiazo components or of polyazo (preferably disazo) diazo components free from sulpho, carboxy and catonic groups.

Preferred diazo component radicals are those of the benzene, benzothiazolyl, benzisothiazolyl, thienyl, thiazolyl or thiadiazolyl series, with those of the benzene series, especially radicals of monoazo or disazo components, being most preferred. Preferably, D is D', where D' is phenyl which is optionally substituted by a total of up to 4 substituents selected from the group consisting of chlorine, bromine (up to 4 of each of these), cyano, iodine, trifluoromethyl, ($C_{1-2}$)alkylsulphonyl, nitro, methyl, methoxy (up to 2 of each of these), phenylaminocarbonyl, formyl, alkyl($C_{1-4}$)carbonyl, alkoxy($C_{1-2}$)carbonyl, aminocarbonyl, ($C_{1-2}$)-alkylaminocarbonyl, di-($C_{1-2}$)alkylaminocarbonyl, phenyl, benzoyl, benzylcarbonyl, phenylsulphonyl, tolylsulphonyl, aminosulphonyl, ($C_{1-2}$)alkylaminosulphonyl, ($C_{1-2}$ alkyl)carbonylamino, thiocyano, di($C_{1-2}$)alkylaminosulphonyl and phenylazo (up to one of each of these) the phenyl of which phenylazo group is optionally substituted by up to three substituents selected from chlorine, bromine (up to three of each of these), methyl, ($C_{1-2}$)alkoxy, cyano, nitro (up to two of each of these) and phenyl (up to one thereof); benzothiazolyl which is optionally substituted by a total of up to two substituents selected from the group consisting of chlorine, bromine, cyano, nitro (up to two of each of these), methyl, ($C_{1-2}$)alkylsulphonyl, aminosulphonyl and thiocyano (up to one of each of these); benzisothiazolyl which is optionally substituted by a total of up to two substituents selected from the group consisting of chlorine, bromine, cyano (up to two of each of these), nitro and ($C_{1-2}$)alkylsulphonyl (up to one of each of these); thienyl which is optionally substituted by a total of up to three substituents selected from the group consisting of chlorine, bromine, cyano, nitro (up to two of each of these), methyl, phenyl, alkyl($C_{1-3}$)carbonyl, hydroxy and methoxycarbonyl (up to one of each of these); thiazolyl which is optionally substituted by a total of up to two substituents selected from the group consisting of chlorine, bromine, cyano (up to two of each of these), methyl, nitro and ($C_{1-2}$)alkylsulphonyl (up to one of each of these); 3-phenyl-1,2,4-thiadiazolyl(5); or 2-phenyl-1,3,4-thiadiazolyl(5).

More preferably D is D″, where D″ is phenyl which is optionally substituted by a total of up to three substituents selected from the group given above.

Even more preferably D is D‴, where D‴ is phenyl which is optionally substituted by a total of up to three substituents selected from chlorine, bromine, iodine, nitro, cyano, ($C_{1-2}$)-alkylsulphonyl (up to two of each of these), aminosulphonyl, alkoxy($C_{1-2}$)carbonyl and di($C_{1-2}$)alkylaminosulphonyl (up to one of each of these).

Most preferably D is $D^{IV}$, where $D^{IV}$, is a group of the formula

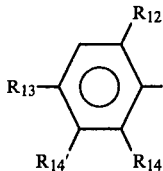

in which
$R_{12}$ is hydrogen, chlorine, bromine, iodine, nitro, cyano, ($C_{1-2}$)alkylsulphonyl or alkoxy($C_{1-2}$)carbonyl,
$R_{13}$ is nitro, aminosulphonyl or di($C_{1-2}$)alkylaminosulphonyl,
$R_{14}$ is hydrogen, chlorine, bromine, iodine, cyano or ($C_{1-2}$)alkylsulphonyl, and
$R_{14}'$ is hydrogen or when $R_{14}$ is hydrogen, $R_{14}'$ is hydrogen, chlorine or bromine.

Preferably $R_{12}$ is $R_{12}'$, and where $R_{12}'$ is nitro or cyano. Preferably $R_{13}$ is nitro. Preferably $R_{14}$ is $R_{14}''$ where $R_{14}''$ is chlorine, bromine, cyano or methylsulphonyl and $R_{14}'$ is hydrogen.

Preferably K is K′, where K′ is unsubstituted 1,4-naphthylene or a group of formula II

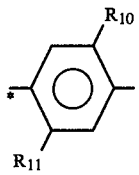

in which
$R_{10}$ is hydrogen, chlorine, bromine, ($C_{1-2}$)-alkyl, ($C_{1-2}$)alkoxy, β-hydroxyethoxy, β-methoxyethoxy or cyano($C_{1-2}$)alkoxy,
$R_{11}$ is hydrogen, chlorine, bromine, ($C_{1-2}$)alkyl, ($C_{1-2}$)alkoxy, alkyl($C_{1-4}$)carbonylamino, bromo- or chloro($C_{1-2}$ alkyl)carbonylamino e.g. bromo- or chloroethylcarbonylamino, cyano, formylamino, alkoxy($C_{1-2}$)alkyl($C_{1-4}$)-carbonylamino, alkoxy($C_{1-4}$)carbonylamino, phenoxyalkyl($C_{1-2}$)carbonylamino, β- or γ-alkoxy($C_{1-2}$)alkoxy($C_{2-3}$)carbonylamino, alkoxy($C_{1-4}$)carbonylalkyl($C_{1-3}$)aminocarbonylamino, benzoylamino or phenylalkyl($C_{1-2}$)carbonylamino, and the asterisk denotes the carbon atom attached to the azo group.

Preferably $R_{10}$ is $R_{10}'$, where $R_{10}'$ is hydrogen, ($C_{1-2}$)-alkoxy or β-hydroxyethoxy.

More preferably $R_{10}$ is $R_{10}''$, where $R_{10}''$ is methoxy or ethoxy.

$R_{11}$ is preferably $R_{11}'$, where $R_{11}'$ is hydrogen, methyl, formylamino, alkyl ($C_{1-2}$)carbonylamino, chloromethylcarbonylamino, $C_{1-2}$alkoxy ($C_{1-4}$)alkylcarbonylamino or $C_{1-4}$alkoxycarbonylamino. More preferably, $R_{11}'$ is alkyl($C_{1-2}$)-carbonylamino, especially ethylcarbonylamino.

$R_1$ is preferably $R_1'$, where $R_1'$ is, in the case where K is a radical of the 1,4-phenylene series, hydrogen; ($C_{1-4}$)-alkyl; ($C_{2-4}$)alkyl monosubstituted in the β-, α- or δ-position by chlorine, bromine, hydroxy, ($C_{1-2}$)alkoxy, formyloxy, alkyl($C_{1-4}$)carbonyloxy, alkoxy($C_{1-2}$)carbonyloxy, ($C_{1-2}$)alkylaminocarbonyloxy, phenoxy, phenyl, benzoyloxy or cyano; β-hydroxy-γ-chloropropyl; benzyl, allyl, 2- or 3-chloro- or bromoallyl; —CH$_2$-CHOHCH$_2$OCH$_2$C≡CH; or —CH$_2$CHOHCH$_2$OCH$_2$—C≡CCH$_2$OCH$_3$ or $R_1'$, in the case where K is 1,4-naphthylene, is hydrogen or ($C_{1-4}$)alkyl.

More preferably, $R_1'$ is $R_1''$, where $R_1''$, in the case where K is 1,4-naphthylene, is hydrogen or ($C_{1-2}$)alkyl and, in the case where k is a radical of the 1,4-phenylene series, is hydrogen, ($C_{1-2}$)alkyl, β- or γ-alkyl($C_{1-2}$)carbonyloxy or cyano-substituted ($C_{2-3}$)alkyl. Most preferably $R_1$ is hydrogen.

$R_2$ is preferably $R_2'$, where $R_2'$ is hydrogen; ($C_{1-4}$)alkyl; ($C_{1-4}$)alkyl monosubstituted by chlorine or bromine or ($C_{2-4}$)alkyl substituted in the β-, γ- or δ-position by ($C_{1-2}$)alkoxy, hydroxy, phenoxy, formyloxy, alkyl($C_{1-3}$)carbonyloxy or benzyloxy; alkyl($C_{1-4}$)carbonyl; benzoyl or alkoxy($C_{1-4}$)carbonyl. More preferably $R_2$ is $R_2''$, where $R_2''$ is hydrogen or ($C_{1-4}$), preferably ($C_{1-2}$), alkyl with hydrogen being most preferred.

Each of $R_3$ and $R_3'$, independently, is preferably $R_{3a}$ and $R_{3a}'$, where $R_{3a}$ and $R_{3a}'$ are independently hydrogen or methyl or together form a cyclohexane ring with the proviso that $R_{3a}$ and $R_{3a}'$ may form a cyclohexane ring only when $R_5$ is hydrogen. More preferably each of $R_3$ and $R_3'$, independently, is hydrogen or methyl, with hydrogen being most preferred.

$R_5$ is preferably $R_5'$, where $R_5'$ is hydrogen, α-($C_{1-2}$)alkoxy($C_{1-3}$)alkyl, β-methoxyethoxymethyl, acetoxymethyl or chloropropionyloxymethyl. More preferably $R_5$ is $R_5''$, where $R_5''$ is hydrogen, β-methoxyethoxymethyl or acetoxymethyl, with hydrogen being especially preferred.

Each of $R_6$ and $R_6'$, independently, is preferably $R_{6a}$ and $R_{6a}'$, where each of $R_{6a}$ and $R_{6a}'$ is, independently, hydrogen, chlorine or bromine, with the proviso that at least one of $R_{6a}$ and $R_{6a}'$ is hydrogen. Most preferably both $R_6$ and $R_6'$ are hydrogen.

$R_7$ is preferably $R_7'$, where $R_7'$ is hydrogen or methyl. Most preferably $R_7$ is hydrogen.

$R_4$ is preferably $R_4'$, where $R_4'$ is —C≡C—$R_5'$ or

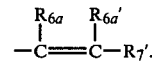

More preferably $R_4$ is $R_4''$, where $R_4''$ is —C≡C—$R_5'$ or vinyl. Most preferably $R_4$ is —C≡C—$R_5''$, especially —C≡C—H.

Preferred compounds of formula I are
(i) those where D is D′, K is K′, $R_1$ is $R_1'$, $R_2$ is $R_2'$, $R_3$ and $R_3'$ are $R_{3a}$ and $R_{3a}'$ and $R_4$ is —C≡C—$R_5$ or

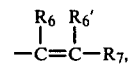

preferably $R_4'$;
(ii) those of (i) but where D is D″;

(iii) those where D is D'', K is K', $R_1$ is $R_1''$, $R_2$ is $R_2'''$, each of $R_3$ and $R_3'$, independently, is hydrogen or methyl and $R_4$ is $R_4'$;

(iv) those of (iii) where D is D''';

(v) those of (iii) where D is $D^{IV}$, K is K', where $R_{10}$ and $R_{11}$ are $R_{10}'$ and $R_{11}'$, $R_1$ is $R_1''$, $R_2$ is $R_2''$, each of $R_3$ and $R_3'$ is hydrogen and $R_4$ is $R_4''$;

(vi) those of (v) where $R_1$ is hydrogen, $R_2$ is hydrogen, and $R_4$ is —C≡C—$R_5''$ or vinyl;

(vii) those of (v) where $R_4$ is —C≡C—$R_5''$;

(viii) those of (vi) wherein $R_{12}$ is $R_{12}'$, $R_{13}$ is nitro, $R_{14}$ is $R_{14}''$ and $R_{14}'$ is hydrogen;

(ix) those of (viii) where $R_4$ is —C≡C—$R_5''$, especially those where $R_4$ is —C≡C—H.

Other compounds of Formula I include (i) those wherein D is $D^{IV}$, wherein $R_{12}$ is $R_{12}'$, $R_{13}$ is nitro, $R_{14}$ is $R_{14}''$ and $R_{14}'$ is hydrogen, K is K', $R_1$ is hydrogen, $R_2$ is hydrogen, and $R_4$ is —C≡C—$R_5''$;

(ii) those wherein D is D', K is K' and $R_4$ is —C≡C—$R_5$;

(iii) those wherein D is D', K is K', $R_1$ is $R_1'$, $R_2$ is $R_2'$, $R_3$ and $R_3'$ are $R_{3a}$ and $R_{3a}'$, respectively, and $R_4$ is —C≡C—$R_5'$;

(iv) those of formula I''

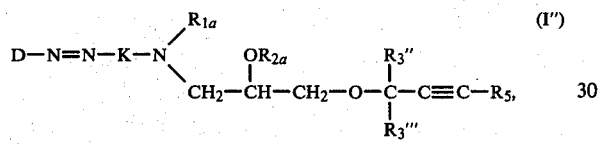

(I'')

wherein

D is a diazo component radical,

K is the radical of a coupling component of the 1,4-phenylene or 1,4-naphthylene series, $R_{1a}$ is hydrogen; $C_{2-4}$alkyl; $C_{2-4}$alkenyl; $C_{2-4}$alkyl monosubstituted by halo, hydroxy, $C_{1-4}$alkoxy, acyloxy, phenyl, phenoxy, cyano, alkynyloxy or alkoxyalkynyloxy; or $C_{2-4}$alkyl substituted by hydroxy and one further substituent selected from the group consisting of halo, hydroxy, $C_{1-4}$alkoxy, acyloxy, phenyl, phenoxy, cyano, alkynyloxy or alkoxyalkynyloxy, with the provisos that $R_{1a}$ may be $C_{2-4}$alkenyl only when K is a coupling component radical of the 1,4-naphthylene series and $R_{1a}$ must be hydrogen, $C_{2-4}$alkyl or $C_{2-4}$alkenyl when K is a coupling component radical of the 1,4-naphthylene series, $R_{2a}$ is hydrogen, acyl, alkyl or alkyl monosubstituted by halo, $C_{1-4}$alkoxy, phenoxy, phenyl, benzyloxy or acyloxy, each of $R_3''$ and $R_3'''$ is independently hydrogen or $C_{1-4}$alkyl or $R_3''$ and $R_3'''$ taken together and with the carbon atom to which they are joined form a cyclohexyl ring, and $R_5$ is hydrogen or $$-\underset{\underset{R_{8'}}{|}}{\overset{\overset{R_8}{|}}{C}}-O-R_9',$$

wherein each of $R_8$ and $R_8'$ is independently hydrogen or alkyl, and $R_9'$ is hydrogen, acyl, alkyl or alkyl monosubstituted by alkoxy, acyloxy or ($C_{1-4}$alkoxy)$C_{2-4}$alkoxy, with the proviso that $R_5$ must be hydrogen when $R_3''$ and $R_3'''$ taken together and with the carbon atom to which they are joined form a cyclohexyl ring;

(v) those of Formula Ia $$O_2N-\underset{R_{14a}}{\overset{R_{12}'}{\bigcirc}}-N=N-K''-NHCH_2CH-CH_2OCH_2-C\equiv CH,$$
$$\underset{OR_2'''}{|}$$ (Ia)

wherein K'' is $$-\underset{NHCOR_{31}}{\overset{OR_{30}}{\bigcirc}}-$$ or 1,4-naphthylene, wherein $R_{30}$ is $C_{1-2}$alkyl, 2-methoxyethyl or 2-hydroxyethyl, and $R_{31}$ is hydrogen, $C_{1-2}$alkyl, chloromethyl, ($C_{1-2}$alkoxy)$C_{1-4}$alkyl or $C_{1-4}$alkoxy, $R_2'''$ is hydrogen or acetyl, $R_{12}'$ is nitro or cyano, and $R_{14a}$ is chloro, bromo, iodo, cyano or methylsulfonyl; and (vi) those of Formula I'''

$$O_2N-\underset{R_{14a}'}{\overset{NO_2}{\bigcirc}}-N=N-\underset{NHCOR_{31}'}{\overset{OR_{30}'}{\bigcirc}}-NHCH_2-\underset{OH}{\overset{|}{C}H}-CH_2-O-CH_2-C\equiv CH,$$ (I''')

wherein $R_{14a}'$ is chloro, bromo or iodo, $R_{30}'$ is methyl or ethyl, and $R_{31}'$ is methyl or ethyl.

The present invention also provides a process for the production of compounds of formula I comprising coupling a diazotized amine of formula IV,

D—NH$_2$      IV with a compound of formula V,

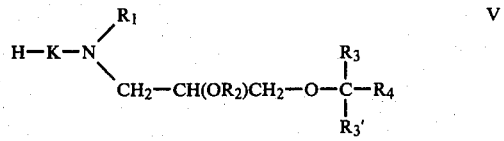

V

Coupling may be carried out in accordance with conventional methods. Diazotization of the amine of formula IV may also be carried out in accordance with known methods.

The compounds of formula IV are known.

The compounds of formula V may be prepared in accordance with conventional methods, for example by condensing a compound of formula VI,

H—K—NHR₁     VI with a compunds of formula VII,

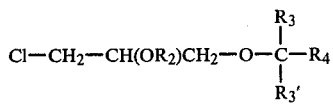

in the presence of an acid binding agent e.g. potassium hydroxide

The compound of formula VII may be prepared by conventional methods, for example by the addition reaction of the corresponding alcohol with epichlorohydrin in the presence of boron trifluoride etherate.

The compounds of formula I are useful as disperse dyestuffs for dyeing or printing synthetic or semi-synthetic, hydrophobic, high molecular weight organic textile substrates. They are especially suitable for exhaust dyeing, pad dyeing or printing substrates which consist of or comprise linear, aromatic polyesters, cellulose 2½ acetate, cellulose triacetate and synthetic polyamides.

The compounds of formula I may be made up into dyeing preparations in accordance with known methods, for example by grinding in the presence of dispersing agents and/or fillers, optionally with vacuum or spray drying.

Dyeing and printing may be carried out in accordance with known methods, for example as described in French Pat. No. 1,445,371.

The dyes of formula I possess notable build-up and give dyeings which have a good depth of shade. Further, the dyes give dyeings which have good sublimation fastness; the dyeings obtained by printing processes possess equally good properties to those obtained by dyeing processes.

The following Examples further serve to illustrate the invention. In the Examples all parts and percentages are by weight and all temperatures are in degrees Centigrade.

EXAMPLE 1

5.6 parts pulverised potassium hydroxide are added portionwise to a mixture of 14.3 parts α-naphthylamine and 14.85 parts, 2-hydroxy-3-chloropropyl-prop-2'-ynylether whereby the temperature rises from 25° to 50°. The mixture is stirred for 10 hours at 85° and cooled to room temperature whereupon approximately 100 parts of diluted hydrochloric acid are added thereto and the mixture is stirred for 10 minutes. The organic phase N-[3-prop-2'-ynyloxy)-2-hydroxy-propyl]-α-naphthylamine in oily form is then separated out.

8 parts of crystalline sodium nitrite are slowly added, with stirring at 60°, to 147 parts concentrated sulphuric acid. The soluton is cooled to 10°–20°, 10 parts glacial acetic acid are added thereto and after further cooling to 0°–5°, 26.2 parts of 2-bromo-4,6-dinitroaniline are added thereto. 10 parts of glacial acetic acid are added to the reaction mixture which is stirred for 3 hours at 0°–5°, the excess nitrosylsulphuric acid being decomposed with a small amount of urea. The diazonium solution so obtained is added, with stirring, to a solution of 25.5 parts of the naphthylamine coupling component, obtained as described above, in 400 parts methanol cooled to 0° to 5°. After coupling is complete, the dyestuff is precipitated out by the addition of a 36% sodium hydroxide solution, stirred for 1 hour, filtered and washed with water until acid free.

In order to improve the dyeing properties and the dispersion stability of the dye, it is added to 100 parts water, stirred for 3 hours at 90°, filtered, washed with water and dried. The dyestuff obtained of the formula

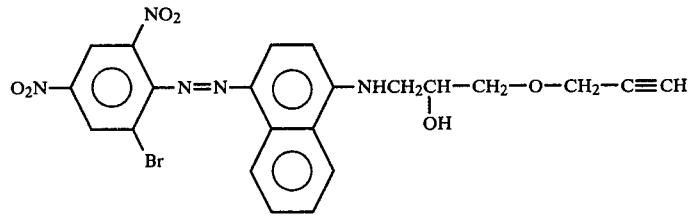

dyes polyester fibres in blue shades.

Further dyestuffs which may be prepared in analogy with the procedure described in Example 1 are given in Tables 1 to 8.

TABLE 1

| Example No. | R₁ | R₃ | R₃' | R₅ | R₂ |
|---|---|---|---|---|---|
| 2 | —C₂H₅ | H | H | H | H |
| 3 | —C₂H₄CN | —CH₃ | H | —CHCH₃OCH₃ | —COCH₃ |
| 4 | " | H | H | H | —CH₃ |
| 5 | H | H | H | —CH₂—OCH₃ | H |

TABLE 1-continued

| No. | R1 | R10 | R11 | OR2 | R3/R3'/R5 |
|---|---|---|---|---|---|
| 6 | H | H | H | H | H |
| 7 | H | —CH3 | —CH3 | —C(CH3)2OC2H5 | H |
| 8 | —C4H9 | H | H | —CH2—OCH3 | —COC6H5 |
| 9 | H | H | H | H | H |
| 10 | —C2H4OCOCH3 | H | H | —CH2—OC2H5 | H |
| 11 | —C2H5 | H | H | H | —COOC2H5 |
| 12 | —CH2—CH2—OCH3 | —CH3 | —C2H5 | H | —CH2—CH2—OCH3 |
| 13 | —C2H4OCOOCH3 | H | H | —CH2—OCOCH3 | CH2CH2—OC6H5 |
| 14 | H | H | H | —CH2—OCOC2H4Cl | H |
| 15 | —CH2—CH=CH2 | H | H | H | —CH2CH2CH2 / H5C6CH2O |
| 16 | —C2H4OCHO | H | H | —CH2—OC2H4OCH3 | H |
| 17 | H | H | H | —CH2—OCH3 | H |
| 18 | —C2H4OCOC4H9 | H | H | H | —COC4H9 |
| 19 | H | H | H | —CH2—OC2H5 | H |
| 20 | —C2H4OC6H5 | —CH3 | —CH3 | —C(CH3)2OCH3 | H |
| 21 | —C2H4Cl | H | H | —CH2OCH3 | —CH2—CH2—Cl |
| 22 | —C2H4OC2H5 | H | H | —CH2—OC2H5 | H |
| 23 | —C2H4OH | H | H | H | —CH2—CH2—Br |
| 24 | —CH2CHOHCH2OCH2C≡CH | H | H | H | H |
| 25 | —CH2—CH2—OH | H | H | —CH2—OCH3 | H |
| 26 | —CH2—C6H5 | H | —CH3 | —CH2—OCH3 | H |
| 27 | —C2H4Br | —CH3 | —CH3 | —C(CH3)2OCH3 | H |
| 28 | —CH2CHOHCH2OCH2C≡CCH2 / OCH3 | H | H | —CH2—OCH3 | H |
| 29 | —C2H5 | H | H | H | —C2H5 |
| 30 | —C2H4OCOC6H5 | H | H | —CH2—OCH3 | H |
| 31 | —C2H4—OCONHCH3 | H | H | " | H |
| 32 | —CH2—CH(OH)—CH2Cl | H | H | H | H |
| 33 | H | H | H | H | H |
| 34 | —C2H5 | —CH3 | —CH3 | H | " |
| 35 | " | H | H | —CH2—OCH3 | " |
| 36a | H | H | H | H | H |
| 36b | H | H | H | H | H |
| 36c | H | H | H | H | H |
| 36d | H | H | H | H | H |
| 36f | H | H | H | H | H |
| 36g | H | H | H | H | H |
| 36h | H | H | H | H | H |
| 36i | H | H | H | H | H |
| 36j | H | H | H | H | H |
| 36k | H | H | H | H | H |
| 36l | H | H | H | H | —COCH3 |
| 36m | H | H | H | H | " |
| 36n | H | H | H | H | H |
| 36o | H | H | H | H | H |
| 36p | H | H | H | H | H |
| 36q | H | H | H | H | H |

| Example No. | R12 | R14 | R13 | R10 | R11 | Shade on polyester |
|---|---|---|---|---|---|---|
| 2 | H | H | —NO2 | H | —CH3 | red |
| 3 | Cl | H | " | H | —NHCOCH3 | " |
| 4 | " | H | —SO2CH3 | H | H | orange |
| 5 | —NO2 | Cl | —NO2 | —OC2H5 | —NHCOCH3 | blue |
| 6 | " | Br | " | —OCH3 | " | " |
| 7 | —NO2 | —CN | " | —OC2H5 | —NHCOC2H5 | " |
| 8 | " | —SO2CH3 | " | —OCH3 | —CH3 | " |
| 9 | —CN | H | " | " | " | violet |
| 10 | Cl | Cl | —NO2 | H | Cl | brown |
| 11 | H | H | C6H5—N=N | H | H | scarlet |
| 12 | Br | Br | —CONH2 | H | —C2H5 | brown |
| 13 | Cl | H | —SO2CH3 | H | —NHCOCH3 | red |
| 14 | Cl | H | —CON(C2H5)2 | —OCH3 | H | orange |
| 15 | —CN | —SO2—C6H4—CH3 | —NO2 | H | —CH3 | blue |
| 16 | H | —CF3 | " | —CH3 | " | red |
| 17 | —NO2 | I | " | —OC2H4—OCH3 | —NHCOC2H4Cl | blue |
| 18 | Br | —CN | " | —OC2H5 | —CH3 | " |
| 19 | —CN | —SO2CH3 | " | —OCH3 | —NHCOCH3 | " |

TABLE 1-continued

Structure: $R_{13}$-(phenyl with $R_{12}$, $R_{14}$)-N=N-(phenyl with $R_{10}$, $R_{11}$)-N($R_1$)-CH$_2$-CH(OR$_2$)-CH$_2$-O-C($R_3$)($R_3'$)-C≡C-R$_5$

| No. | | | | | | |
|-----|------|----------|------------|--------|------------|--------|
| 20 | Cl | H | —CONHCH$_3$ | H | H | orange |
| 21 | Br | —COOCH$_3$ | —NO$_2$ | H | —CH$_3$ | red |
| 22 | Br | H | —SO$_2$NHCH$_3$ | H | —NHCOC$_2$H$_4$Cl | " |
| 23 | Cl | H | —CON(CH$_3$)$_2$ | H | H | orange |
| 24 | Cl | H | —CONHC$_6$H$_5$ | H | H | " |
| 25 | Cl | H | —C$_6$H$_5$ | H | —CH$_3$ | red |
| 26 | Cl | H | —SO$_2$NH$_2$ | H | H | orange |
| 27 | H | —SCN | —NO$_2$ | —OCH$_3$ | —CH$_3$ | violet |
| 28 | H | —COC$_6$H$_5$ | " | " | H | red |
| 29 | —CH$_3$ | —COCH$_3$ | —NO$_2$ | H | H | " |
| 30 | Cl | —COCH$_2$C$_6$H$_5$ | " | H | Cl | " |
| 31 | Br | H | " | H | H | " |
| 32 | Cl | H | —NO$_2$ | H | H | " |
| 33 | H | H | —COCH$_3$ | H | H | yellow |
| 34 | H | H | —COC$_6$H$_5$ | H | Cl | " |
| 35 | Cl | —COC$_4$H$_9$ | —NO$_2$ | H | —CH$_3$ | " |
| 36a | —NO$_2$ | Cl | " | —OC$_2$H$_5$ | —NHCOCH$_3$ | blue |
| 36b | " | I | " | " | " | " |
| 36c | " | Br | " | " | —NHCOC$_2$H$_5$ | " |
| 36d | " | Cl | " | " | " | " |
| 36f | " | I | " | " | " | " |
| 36g | " | Cl | " | —OCH$_3$ | —NHCOCH$_3$ | " |
| 36h | " | I | " | " | " | " |
| 36j | " | Br | " | " | —NHCOC$_2$H$_5$ | " |
| 36j | " | Cl | " | " | " | " |
| 36k | " | I | " | " | " | " |
| 36l | " | Br | " | —OC$_2$H$_5$ | —NHCOCH$_3$ | " |
| 36m | " | Cl | " | —OCH$_3$ | " | " |
| 36n | —CN | —CN | " | H | —CH$_3$ | " |
| 36o | " | " | " | —OCH$_3$ | " | " |
| 36p | " | —NO$_2$ | " | —OC$_2$H$_5$ | —NHCOCH$_3$ | " |
| 36q | Br | —CN | " | " | " | " |

TABLE 2

Structure: $R_{13}$-(phenyl with $R_{12}$, $R_{14'}$)-N=N-(phenyl with $R_{10}$, $R_{11}$)-N($R_1$)-CH$_2$-CH(OR$_2$)-CH$_2$-O-C($R_3$)($R_3'$)-C≡C-R$_5$

| Example No. | $R_1$ | $R_3$ | $R_3'$ | $R_5$ | $R_2$ | $R_{12}$ |
|---|---|---|---|---|---|---|
| 37 | —C$_2$H$_5$ | H | H | H | H | Cl |
| 38 | H | H | H | —CH$_2$—OCH$_3$ | " | Cl |
| 39 | —C$_2$H$_4$OCOC$_6$H$_5$ | H | H | " | " | —NO$_2$ |
| 40 | —C$_2$H$_4$OCOOCH$_3$ | H | H | H | —COC$_6$H$_5$ | —CH$_3$ |
| 41 | H | —CH$_3$ | —CH$_3$ | H | —COCH$_3$ | —OCH$_3$ |
| 42 | —C$_4$H$_9$ | H | H | —CH$_2$—OCH$_3$ | " | Cl |
| 43 | —C$_3$H$_7$ | H | H | H | " | —OCH$_3$ |

| Example No. | $R_{14'}$ | $R_{13}$ | $R_{10}$ | $R_{11}$ | Shade on polyester |
|---|---|---|---|---|---|
| 37 | Cl | —NO$_2$ | H | —NHCOCH$_3$ | red |
| 38 | Cl | —SO$_2$N(CH$_3$)$_2$ | H | —CH$_3$ | " |
| 39 | —NHCOCH$_3$ | —NO$_2$ | —OC$_2$H$_5$ | —NHCOCH$_3$ | blue |
| 40 | —CH$_3$ | " | H | —CH$_3$ | red |
| 41 | —OCH$_3$ | " | H | Cl | " |
| 42 | Cl | " | —OCH$_3$ | —CH$_3$ | violet |
| 43 | —CH$_3$ | " | H | " | red |

TABLE 3

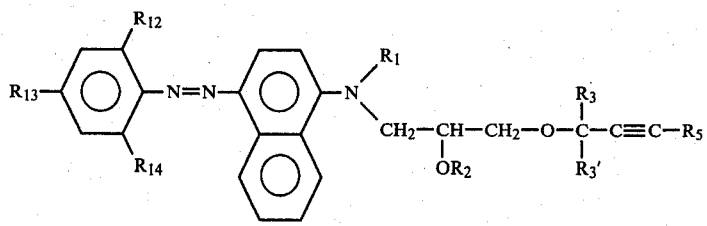

| Example No. | $R_1$ | $R_3$ | $R_3'$ | $R_2$ | $R_5$ | $R_{12}$ | $R_{14}$ | $R_{13}$ | Shade on polyester |
|---|---|---|---|---|---|---|---|---|---|
| 44 | H | H | H | —COCH₃ | H | —NO₂ | Cl | —NO₂ | blue |
| 45 | H | H | H | " | —CH₂—OCH₃ | Br | —CN | " | " |
| 46 | H | —CH₃ | —CH₃ | " | H | I | —NO₂ | " | " |
| 47 | —C₂H₅ | H | H | " | —CH₂—OCH₃ | —NO₂ | Br | " | " |
| 48 | —C₄H₉ | H | H | " | " | —CN | —SO₂CH₃ | " | " |
| 49 | " | H | H | " | H | " | —CN | " | " |
| 50 | H | —CH₃ | —CH₃ | —COCH₃ | —C(CH₃)₂OCH₃ | —NO₂ | Br | " | " |

TABLE 4

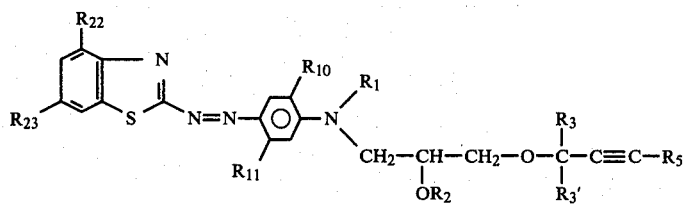

| Example No. | $R_1$ | $R_3$ | $R_3'$ | $R_2$ | $R_5$ |
|---|---|---|---|---|---|
| 51 | —C₂H₄CN | H | H | H | H |
| 52 | —C₂H₄OCOCH₃ | H | H | H | —CH₂OCH₃ |
| 53 | H | H | H | —COCH₃ | H |
| 54 | H | H | H | —COC₄H₉ | —CH₂—OCH₃ |
| 55 | —C₄H₉ | —CH₃ | —CH₃ | —C₄H₉ | H |
| 56 | —C₂H₅ | H | H | —C₂H₅ | —CH₂—OCOCH₃ |
| 57 | —C₂H₄CN | —CH₃ | —CH₃ | H | —C(CH₃)₂OCH₃ |
| 58 | H | H | H | H | H |
| 59 | H | H | H | H | H |
| 60 | —C₂H₅ | H | H | H | —CH₂—OCH₃ |
| 61 | H | H | H | H | H |
| 62 | —C₂H₅ | H | H | —COOC₄H₉ | —CH₂—OC₂H₅ |
| 63 | H | —CH₃ | —CH₃ | H | —C(CH₃)₂OCH₃ |
| 64 | —C₂H₄OH | H | H | H | —CH₂—OCOCH₃ |

| Example No. | $R_{22}$ | $R_{23}$ | $R_{10}$ | $R_{11}$ | Shade on polyester |
|---|---|---|---|---|---|
| 51 | H | —CN | H | —NHCOCH₃ | red |
| 52 | H | —SO₂CH₃ | H | —CH₃ | " |
| 53 | —NO₂ | —NO₂ | —OC₂H₅ | —NHCOCH₃ | blue |
| 54 | Cl | —CN | H | " | violet |
| 55 | H | —NO₂ | —OCH₃ | —CH₃ | " |
| 56 | H | Cl | H | —CH₃ | red |
| 57 | H | —SO₂NH₂ | H | —NHCOCH₃ | " |
| 58 | H | —SCN | —OC₂H₅ | " | blue |
| 59 | Cl | Cl | H | Cl | red |
| 60 | H | —SO₂C₂H₅ | —OCH₃ | —CH₃ | " |
| 61 | Br | Cl | H | H | " |
| 62 | Br | Br | H | H | " |
| 63 | —CH₃ | —CN | H | Cl | " |
| 64 | —CN | —CN | H | —NHCOCH₃ | " |

TABLE 5

Structure: R24,R15-thiazole-N=N-phenyl(R10,R11)-N(R1)-CH2-CH(OR2)-CH2-O-C(R3)(R3')-C≡C-R5

| Example No. | R1 | R3 | R3' | R2 | R5 | R24 | R15 | R10 | R11 | Shade on polyester |
|---|---|---|---|---|---|---|---|---|---|---|
| 65 | H | H | H | H | H | H | —NO2 | H | —NHCOCH3 | blue |
| 66 | H | H | H | —COCH3 | —CH2—OCH3 | —CH3 | " | —OC2H5 | " | " |
| 67 | —C2H5 | H | H | " | H | Cl | Cl | H | —CH3 | " |
| 68 | H | H | H | " | —CH2—OCOCH3 | Br | Br | —OC2H5 | —NHCOCH3 | " |
| 69 | H | —CH3 | —CH3 | H | —CH2—OCH3 | Cl | —NO2 | —OCH3 | —CH3 | " |
| 70 | H | H | H | H | H | Br | —CN | H | Cl | " |
| 71 | —C2H5 | H | H | H | H | H | —SO2C2H5 | H | —CH3 | " |
| 72 | —C2H4OCOCH3 | H | H | H | H | —CN | —CN | —OCH3 | " | " |

TABLE 6

Structure: R20,R21,R19-thiophene-N=N-phenyl(R10,R11)-N(R1)-CH2-CH(OR2)-CH2-O-C(R3)(R3')-C≡C-R5

| Example No. | R1 | R3 | R3' | R5 | R2 | R19 |
|---|---|---|---|---|---|---|
| 73 | H | H | H | H | H | —COOCH3 |
| 74 | H | H | H | H | H | —CN |
| 75 | H | H | H | —CH2—OCH3 | H | —CN |
| 76 | —C2H5 | H | H | —CH2—OC2H5 | H | —CN |
| 77 | " | —CH3 | —CH3 | —CH2—OCH3 | —COCH3 | —NO2 |
| 78 | —C2H4OH | H | H | H | —COC3H7 | —OH |
| 79 | H | H | H | H | —COC4H9 | Cl |
| 80 | —C2H4Cl | H | H | —CH2—OCH3 | H | Br |
| 81 | H | H | H | H | H | —COC2H5 |
| 82 | —C2H5 | —CH3 | H | —CH2—OCOCH3 | H | —COC3H7 |

| Example No. | R20 | R21 | R10 | R11 | Shade on polyester |
|---|---|---|---|---|---|
| 73 | —CH3 | —CN | —OC2H5 | —NHCOCH3 | blue |
| 74 | H | —NO2 | H | H | red |
| 75 | —CH3 | —CN | —OC2H5 | —NHCOCH3 | blue |
| 76 | —C6H5 | —NO2 | H | Cl | red |
| 77 | —CH3 | —NO2 | —OCH3 | —CH3 | violet |
| 78 | —CH3 | H | H | H | red |
| 79 | Cl | H | H | —CH3 | " |
| 80 | Br | H | H | —CH3 | " |
| 81 | Cl | H | H | —NHCOCH3 | red |
| 82 | Br | H | H | Cl | " |

TABLE 7

Structure: R16,R17,R18-benzisothiazole-N=N-phenyl(R10,R11)-N(R1)-CH2-CH(OR2)-CH2-O-C(R3)(R3')-C≡C-R5

| Example No. | R1 | R3 | R3' | R5 | R2 |
|---|---|---|---|---|---|
| 83 | —C2H4OCOCH3 | H | H | H | H |
| 84 | —C2H5 | H | H | —CH2—OCH3 | " |
| 85 | H | H | H | H | " |
| 86 | —C2H4OH | H | H | H | " |
| 87 | H | H | —CH3 | —CH2—OC2H5 | " |
| 88 | —C4H9 | —CH3 | —CH3 | —CH2—OCH3 | —COCH3 |
| 89 | H | H | H | H | " |

Example  Shade on

TABLE 7-continued

Structure:
$R_{17}$, $R_{16}$ on benzisothiazole ring (with $R_{18}$), connected via N=N to phenyl ring bearing $R_{10}$, $R_{11}$, and N(R_1)–CH_2–CH(OR_2)–CH_2–O–C(R_3)(R_3')–C≡C–R_5

| No. | $R_{16}$ | $R_{17}$ | $R_{18}$ | $R_{10}$ | $R_{11}$ | polyester |
|---|---|---|---|---|---|---|
| 83 | Br | H | Br | H | —NHCOCH$_3$ | blue |
| 84 | Cl | H | Cl | —OCH$_3$ | —CH$_3$ | " |
| 85 | Cl | H | —CN | H | " | " |
| 86 | H | Br | H | H | —NHCOC$_2$H$_4$Cl | " |
| 87 | —SO$_2$C$_2$H$_5$ | H | H | H | —CH$_3$ | " |
| 88 | —CN | H | —CN | —OCH$_3$ | —CH$_3$ | " |
| 89 | H | H | —NO$_2$ | —OCH$_3$ | —CH$_3$ | " |

TABLE 8

| Example No. | Structure | Shade on polyester |
|---|---|---|
| 90 | O$_2$N–C$_6$H$_2$(NO$_2$)(Br)–N=N–naphthyl–NH–CH$_2$–CH(OH)–CH$_2$–O–C(H)(cyclohexyl)–C≡CH | blue |
| 91 | O$_2$N–C$_6$H$_2$(NO$_2$)(Cl)–N=N–C$_6$H$_2$(OC$_2$H$_5$)(NHCOCH$_3$)–NH–CH$_2$–CH(OH)–CH$_2$–O–C(H)(cyclohexyl)–C≡CH | " |
| 92 | O$_2$N–C$_6$H$_3$(Cl)–N=N–C$_6$H$_3$(OCH$_3$)–NH–CH$_2$–CH(OCOCH$_3$)–CH$_2$–O–C(H)(cyclohexyl)–C≡CH | red |
| 93 | O$_2$N–(thiazolyl)–N=N–naphthyl–NH–CH$_2$–CH(OH)–CH$_2$–O–CH$_2$–C≡CH | blue |
| 94 | C$_6$H$_5$–(thiadiazolyl)–N=N–C$_6$H$_4$–NH–CH$_2$–CH(OH)–CH$_2$–O–CH$_2$–C≡C–CH$_2$–OCH$_3$ | red |
| 95 | C$_6$H$_5$–(thiadiazolyl)–N=N–C$_6$H$_3$(CH$_3$)–NH–CH$_2$–CH(OH)–CH$_2$–O–CH$_2$–C≡CH | " |
| 96 | Cl–benzisothiazolyl–N=N–C$_6$H$_4$–NH–CH$_2$–CH(OCOCH$_3$)–CH$_2$–O–CH$_2$–C≡C–CH$_2$OC$_2$H$_5$ | " |
| 97 | CH$_3$,CN-substituted benzisothiazolyl–N=N–C$_6$H$_3$(Cl)–NH–CH$_2$–CHOH–CH$_2$–O–C(H)(cyclohexyl)–C≡CH | " |

EXAMPLE 98

14.3 parts α-naphthylamine and 11.4 parts allylglycidylether are stirred for 10 hours at 80°. The mixture is cooled to room temperature and 50 parts dilute hydrochloric acid are added thereto whereupon the mixture is stirred for about 10 minutes and the organic phase, N-(3-allyloxy-2-hydroxypropyl)-α-naphthylamine, is separated.

26.2 parts 2-bromo-4,6-dinitro-aniline are added to a mixture (prepared at a temperature under 20°) of 122 parts concentrated sulphuric acid and 35 parts 4% nitrosylsulphuric acid keeping the temperature under 20° and the mixture was stirred for 3 hours. The solution obtained, with stirring and cooling to 0° to 5°, is added dropwise to 25.7 parts of the coupling component, prepared as described above, dissolved in 100 parts methanol. After coupling is complete, the dyestuff is precipitated with 30% sodium hydroxide, stirred for 1 hour, filtered and washed free from acid. The dye is then added to 100 parts water, stirred at 90° for 2 hours, filtered, washed with water and dried. The dyestuff is obtained of the formula

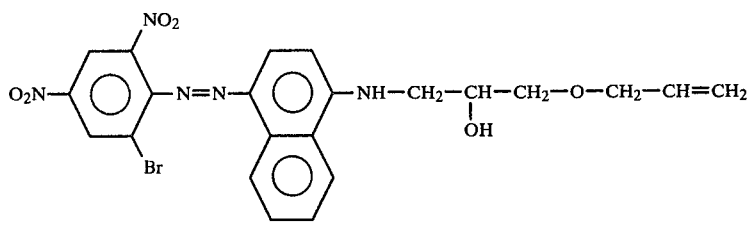

dyes polyester fibres in blue shades.

In Tables 9 and 10, further dyestuffs which may be prepared in analogy with the procedure described in Example 98 are given.

TABLE 9

| Example No. | $R_1$ | $R_2$ | $R_6$ | $R_6'$ | $R_7$ | $R_{12}$ | $R_{14}$ | Shade on polyester |
|---|---|---|---|---|---|---|---|---|
| 99 | H | H | H | H | H | Cl | —NO$_2$ | blue |
| 100 | —C$_2$H$_5$ | H | H | Cl | H | Br | " | " |
| 101 | H | —C$_2$H$_5$ | H | Br | H | I | " | " |
| 102 | H | —COCH$_3$ | H | Cl | —CH$_3$ | Br | —CN | " |
| 103 | -nC$_4$H$_9$ | —CHO | Br | H | H | Br | " | " |
| 104 | H | H | H | H | H | —SO$_2$CH$_3$ | —NO$_2$ | " |
| 105 | —CH$_3$ | H | H | H | H | —CN | —CN | " |
| 106 | H | —COC$_2$H$_5$ | H | Cl | H | —SO$_2$CH$_3$ | " | " |
| 107 | -nC$_3$H$_7$ | —CH$_2$C$_6$H$_5$ | H | H | H | I | —NO$_2$ | " |
| 108 | H | H | H | H | H | H | —CN | violet |
| 109 | H | H | H | H | H | —SO$_2$C$_6$H$_5$ | —NO$_2$ | blue |
| 110 | —CH$_3$ | —COCH$_2$Cl | H | H | H | —SO$_2$C$_2$H$_5$ | " | " |
| 111 | H | —CH$_2$CH$_2$OH | H | H | H | —SCN | " | " |
| 112 | —C$_2$H$_5$ | —COCH$_3$ | H | Cl | H | H | Cl | rubine |
| 113 | H | H | H | H | H | I | —NO$_2$ | blue |
| 114 | H | —COCH$_3$ | H | H | H | Cl | " | " |
| 115 | H | " | H | H | H | Br | " | " |
| 116 | H | " | H | H | H | I | " | " |

TABLE 10

| Example No. | $R_1$ | $R_2$ | $R_6$ | $R_6'$ | $R_7$ | D | Shade on polyester |
|---|---|---|---|---|---|---|---|
| 117 | H | H | H | H | H | O$_2$N—[thiadiazolyl] | blue |
| 118 | H | —COOCH$_3$ | H | H | H | H$_3$C—, O$_2$N—[thiadiazolyl] | " |
| 119 | —C$_2$H$_5$ | —COCH$_3$ | H | H | H | Cl—, O$_2$N—[thiadiazolyl] | " |

TABLE 10-continued $$D-N=N-\underset{\underset{OR_2}{|}}{\overset{R_1}{\underset{|}{N}}}\text{-naphthyl}-CH_2-CH-CH_2-O-CH_2-\underset{R_6}{\overset{R_6}{C}}=\underset{}{\overset{R_6'}{C}}-R_7$$

| Example No. | $R_1$ | $R_2$ | $R_6$ | $R_6'$ | $R_7$ | D | Shade on polyester |
|---|---|---|---|---|---|---|---|
| 120 | H | H | Cl | H | H | 2,4-dinitro-6-(thiazol-2-yl)phenyl (NO$_2$, O$_2$N, N/S) | " |
| 121 | H | —COCH$_2$Cl | H | H | H | 3-cyano-5-methoxycarbonyl-2,4-dimethylthiophen-yl (H$_3$C, COOCH$_3$, NC, S) | " |
| 122 | —CH$_3$ | H | H | Br | H | 3,5-dicyano-2,4-dimethylthiophen-yl (H$_3$C, CN, NC, S) | " |
| 123 | H | H | H | H | H | 6-nitro-benzisothiazol-3-yl (O$_2$N, N, S) | " |

In Table 11, further dyestuffs which may be prepared in analogy with the procedure described in Example 1 are given.

TABLE 11

Structure:

$R_{13}$-, $R_{14}$-substituted phenyl—N=N—phenyl (with $R_{10}$, $R_{11}$, $R_{12}$) —N($R_1$)—CH$_2$—CH(OR$_2$)—CH$_2$—O—C(R$_3$)(R$_3'$)—R$_4$

| Example No. | $R_1$ | $R_3$ | $R_3'$ | $R_4$ | $R_2$ | $R_{12}$ | $R_{14}$ | $R_{13}$ | $R_{10}$ | $R_{11}$ | Shade on polyester |
|---|---|---|---|---|---|---|---|---|---|---|---|
| 124 | —C$_2$H$_4$—O—C$_2$H$_5$ | H | H | —C≡CH | —CH$_2$CH$_2$—OCHO | —CN | —CN | —NO$_2$ | Cl | —NHCHO | blue |
| 125 | —CH$_2$CH=CH$_2$ | H | H | —C≡CH | —CH$_2$CH$_2$—O—COCH$_3$ | CHO | —CF$_3$ | —NO$_2$ | Br | —NHC$_2$H$_4$—O—C$_2$H$_5$ | red |
| 126 | —CH$_2$—CCl=CH$_2$ | CH$_3$ | H | —C≡CH | —CH$_2$CH$_2$—O—COC$_2$H$_5$ | —SO$_2$CH$_3$ | —SO$_2$CH$_3$ | —NO$_2$ | —CH$_3$ | —CN | blue |
| 127 | —CH$_2$—CCl=CH$_2$ | H | —CH$_3$ | —C≡CH | —CH$_2$CH$_2$—O—OCOC$_3$H$_7$ | —SO$_2$C$_2$H$_5$ | —SO$_2$CH$_3$ | —NO$_2$ | —C$_2$H$_5$ | —NHCOC$_6$H$_5$ | blue |
| 128 | —CH$_2$CH$_2$—C$_6$H$_5$ | H | H | —C≡CH | —C$_6$H$_5$ | I | I | —NO$_2$ | —OCH$_3$ | —NHCO—C$_4$H$_8$O—CH$_3$ | brown |
| 129 | -n(CH$_2$)$_4$—O—COH | H | H | —C≡CH | H | Br | H | —SO$_2$NHC$_2$H$_5$ | —OC$_2$H$_4$—OH | —NHC—C$_4$H$_8$O—CH$_3$ | red |
| 130 | H | H | H | —C≡CH | H | I | H | —SO$_2$NH$_2$ | H | —NHC—O—CH$_3$ | " |
| 131 | H | H | H | —C≡C—CH$_2$—OCH$_3$ | —COOC$_2$H$_5$ | —COOC$_2$H$_5$ | H | —NO$_2$ | H | —NHC—O—C$_4$H$_9$ | " |
| 132 | —C$_4$H$_8$—O—C$_2$H$_5$ | H | H | —C≡CH | —COCH$_3$ | —COOCH$_3$ | H | —NO$_2$ | H | —OC$_2$H$_5$ | red |
| 133 | —C$_3$H$_6$—OCOCH$_3$ | —CH$_3$ | H | —C≡CH | —COCH$_3$ | H | H | C$_6$H$_5$—C$_6$H$_4$—N=N— | H | —NHCO—CH$_2$—C$_6$H$_5$—OCH$_3$ | red |
| 134 | —C$_2$H$_4$—OCOOC$_2$H$_5$ | CH$_3$ | H | —C≡CH | H | Cl | H | 4-NO$_2$—C$_6$H$_4$—N=N— | H | —NHCO—CH$_2$—C$_6$H$_4$C$_6$H$_5$ | " |
| 135 | —CH$_2$—O—CONHC$_2$H$_5$ | H | H | —C≡CH | —CH$_3$ | Br | H | 2,4-di-NO$_2$—C$_6$H$_3$—N=N— | H | —NH—CO—C$_2$H$_4$—OCH$_3$ | " |
| 136 | —CH$_2$—CBr=CH$_2$ | H | H | —C≡CH | H | H | H | 4-NO$_2$-2-CN—C$_6$H$_3$—N=N— | H | —NH—CO—C$_3$H$_6$OC$_2$H$_5$ | " |
| 137 | —C$_3$H$_7$ | H | H | —C≡CH | —C$_2$H$_5$ | H | H | 3-CH$_3$—C$_6$H$_4$—N=N— | H | —NH—CO—NH—CH$_2$ CH$_3$O—CO | " |
| 138 | —C$_2$H$_5$ | H | H | —C≡CH | H | H | H | 2,3,5-tri-Cl—C$_6$H$_2$—N=N— | H | —NH—CO—NH—C$_3$H$_6$ C$_4$H$_9$O—CO | " |
| 139 | —C$_4$H$_9$ | H | H | —C≡CH | H | H | H | 3,4-di-Br—C$_6$H$_3$—N=N— | H | —NH—CO—CH$_2$—C$_6$H$_5$ | " |
| 140 | —C$_2$H$_4$CN | H | H | —C≡CH | H | H | H | 3,5-di-OCH$_3$—C$_6$H$_3$—N=N— | H | —NH—CO—C$_2$H$_4$C$_6$H$_5$ | " |
| 141 | —C$_2$H$_4$OCOCH$_3$ | H | H | —C≡CH | H | H | H | 2-Br—C$_6$H$_4$—N=N— | H | —NH—CO—C$_2$H$_4$Br | " |
| 142 | H | H | H | " | H | H | NO$_2$ | —NO$_2$ | H | —NH—CO—CH$_3$ | blue |
| 143 | Cl—phenyl(Cl,Cl,Cl)—N(C$_2$H$_5$)—CH$_2$—CH(OH)—CH$_2$— | | | | | —CN | | | —OCH$_3$ | —OCH$_3$ | yellow |
| 144 | Br—phenyl(Br,Br)—N=N—phenyl(CH$_3$)—N(C$_2$H$_5$)—CH$_2$—CH(OH)—CH$_2$—O—CH$_2$—C≡CH | | | | | | | | | | yellow |

EXAMPLE 145

15.1 parts N-methyl-2-methoxy-5-methylaniline and 20 parts 2-hydroxy-3-chloropropyl-prop-2′-ynylether are mixed and 7 parts pulverized potassium hydroxide are added portionwise thereto whereby the temperature rises from 25° to 50°. The mixture is stirred for 10 hours at 85° and cooled to room temperature. 100 parts dilute hydrochloric acid are added thereto and the mixture is stirred for 10 minutes. The organic phase, N-methyl-N-[3-prop-2′-ynyloxy-2-hydroxypropyl]-2-methoxy-5-methylaniline, is separated out.

To 122.5 parts conc. sulphonic acid, 35 parts nitrosylsulphuric acid (40%) are added dropwise over a period of 15 minutes at a temperature of max. 20° C. At the same temperature 26.2 parts 2-bromo-4,6-dinitroaniline are added thereto over a period of 30 minutes and the whole is stirred for 6 hours at max. 20°. At 0° to 5° the solution is added to 26.3 parts of the coupling component produced above in 200 parts methanol, which solution is cooled externally. After coupling is complete 30% NaOH is added to precipitate the dyestuff. The dyestuff is filtered and washed with water until acid free.

The dyestuff obtained corresponds to the formula

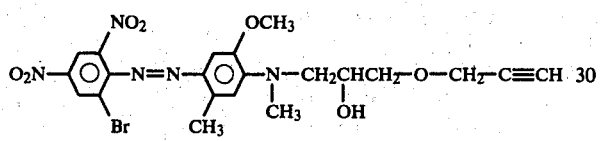

and dyes polyester by the rapid dyeing process in navy blue shades.

EXAMPLE 146

In analogous manner the dyestuff of the formula

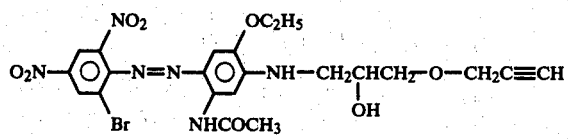

is produced using 30.6 parts coupling component and coupling is conducted in a mixture of 100 parts water/20 parts glacical acetic acid and 10 parts hydrochloric acid, ice being added to keep the temperature at 0° to 5°.

The dyestuff dyes polyester in blue shades.

APPLICATION EXAMPLE

7 Parts of the dyestuff produced in accordance with Example 1 are ground to a fine powder in a ball mill for 48 hours with 4 parts sodium dinaphthylmethanedisulphonate, 4 parts sodium ethylsulphate and 5 parts anhydrous sodium sulphate.

1 Part of the dyestuff preparation obtained is mixed with a little water and the suspension is added through a sieve to a dyebath containing 2 parts sodium laurylsulphate in 4000 parts water. 100 parts of scoured polyester material is added to the bath at 40°-50° C. (liquor ratio 1:40), 20 parts of chlorobenzene are added thereto, the bath is slowly heated to 100° C. and dyeing is effected for 1 to 2 hours at 95°-100° C. The dyed substrate is washed, soaped, washed again and dried. The deep blue level dyeing possesses notable light-, wash-, sublimation-, thermofixation- and permanent pressfastness.

The compounds of Examples 2 to 146 may also be employed to dye polyester in analogous manner.

What is claimed is:

1. A disperse dye of the formula

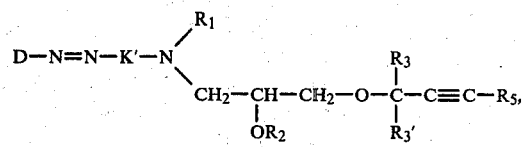

wherein
D is a diazo component radical,

K′ is 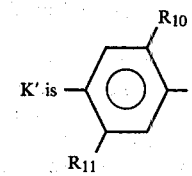

or 1,4-naphthylene, wherein $R_{10}$ is hydrogen, chloro, bromo, $C_{1-2}$alkyl, $C_{1-2}$alkoxy, 2-hydroxyethoxy, 2-methoxyethoxy or cyano($C_{1-2}$alkoxy), and $R_{11}$ is hydrogen, chloro, bromo, $C_{1-2}$alkyl, $C_{1-2}$alkoxy, ($C_{1-4}$alkyl)carbonylamino, ($C_{1-2}$chloroalkyl)carbonylamino, ($C_{1-2}$-bromoalkyl)carbonylamino, cyano, formamido, ($C_{1-2}$alkoxy)($C_{1-4}$alkyl)-carbonylamino, ($C_{1-4}$alkoxy)carbonylamino, phenoxy($C_{1-2}$alkyl)carbonylamino, 2-($C_{1-2}$alkoxy)($C_{2-3}$-alkoxy)carbonylamino, 3-($C_{1-2}$alkoxy)propoxycarbonylamino, ($C_{1-4}$alkoxy)carbonyl ($C_{1-3}$alkyl)aminocarbonylamino, benzamido or phenyl-($C_{1-2}$alkyl)carbonylamino, $R_{11}$ being ortho to the —N=N— radical, $R_1$ is hydrogen; $C_{1-6}$alkyl; $C_{2-6}$alkenyl; $C_{2-6}$haloalkenyl; $C_{1-6}$alkyl monosubstituted by halo, hydroxy, $C_{1-6}$alkoxy, acyloxy, phenyl, phenoxy, cyano, $C_{2-6}$alkenyloxy, $C_{2-6}$alkynyloxy or ($C_{1-6}$alkoxy)$C_{2-6}$alkynyloxy; or $C_{1-6}$alkyl substituted by hydroxy and one further substituent selected from the group consisting of halo, hydroxy, $C_{1-6}$alkoxy, acyloxy, phenyl, phenoxy, cyano, $C_{2-6}$alkenyloxy, $C_{2-6}$alkynyloxy and ($C_{1-6}$alkoxy)$C_{2-6}$alkynyloxy, with the proviso that $R_1$ must be hydrogen, $C_{1-6}$alkyl or $C_{2-6}$alkenyl when K′ is 1,4-naphthylene, $R_2$ is hydrogen, acyl, $C_{1-6}$alkyl or $C_{1-6}$alkyl monosubstituted by halo, $C_{1-6}$alkoxy, phenyl, phenoxy, benzyloxy, hydroxy or acyloxy, each of
$R_3$ and $R_3'$ is independently hydrogen or $C_{1-6}$alkyl or
$R_3$ and $R_3'$ taken together and with the carbon atom to which they are joined form a cyclohexyl ring, and $R_5$ is hydrogen or

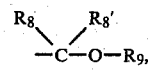

wherein each of
$R_8$ and $R_8'$ is independently hydrogen or $C_{1-6}$alkyl, and R$_9$ is hydrogen, acyl, C$_{1-6}$alkyl or C$_{1-6}$alkyl monosubstituted by C$_{1-6}$alkoxy, (C$_{1-6}$alkoxy)C$_{1-6}$alkoxy or acyloxy, with the proviso that R$_5$ must be hydrogen when R$_3$ and R$_3'$ taken together and with the carbon atom to which they are joined form a cyclohexyl ring, wherein each acyl and the acyl moiety of each acyloxy is independently R—O—CO—, R—SO$_2$—, R'—CO—, R'—NR"—CO— or R'—NR"—SO$_2$—, wherein R is C$_{1-6}$alkyl, C$_{1-6}$haloalkyl, 2-hydroxypropyl, 3-hydroxypropyl, 2,3-dihydroxypropyl, phenyl, tolyl or benzyl, and each of R' and R" is independently hydrogen, C$_{1-6}$alkyl, C$_{1-6}$haloalkyl, 2-hydroxypropyl, 3-hydroxypropyl, 2,3-dihydroxypropyl, phenyl, tolyl or benzyl, and each halo is independently fluoro, chloro, bromo or iodo.

2. A disperse dye according to claim 1 wherein R$_{11}$ is hydrogen, chloro, bromo, C$_{1-2}$alkyl, C$_{1-2}$alkoxy, (C$_{1-4}$alkyl)carbonylamino, chloroethylcarbonylamino, bromoethylcarbonylamino, cyano, formamido, (C$_{1-2}$alkoxy) (C$_{1-4}$alkyl)carbonylamino, (C$_{1-4}$alkoxy)carbonylamino, phenoxy(C$_{1-2}$alkyl)carbonylamino, 2-(C$_{1-2}$alkoxy) (C$_{2-3}$alkoxyl)carbonylamino, 3-(C$_{1-2}$alkoxy)propoxycarbonylamino, (C$_{1-4}$alkoxy)carbonyl(-C$_{1-3}$alkyl)aminocarbonylamino, benzamido or phenyl(-C$_{1-2}$alkyl)carbonylamino, R$_{11}$ being ortho to the —N═N— radical.

3. A compound of the formula

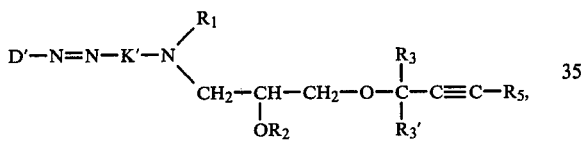

wherein D' is phenyl; substituted phenyl having 1 to 4 substituents each of which is independently chloro, bromo, iodo (maximum of two), cyano (maximum of two), trifluoromethyl (maximum of two), C$_{1-2}$alkylsulfonyl (maximum of two), nitro (maximum of two), methyl (maximum of two), methoxy (maximum of two), formyl (maximum of one), (C$_{1-4}$alkyl)carbonyl (maximum of one), (C$_{1-2}$alkoxy)carbonyl (maximum of one), carbamoyl (maximum of one), (C$_{1-2}$alkyl)carbamoyl (maximum of one), di-(C$_{1-2}$alkyl)carbamoyl (maximum of one), phenylcarbamoyl (maximum of one), (C$_{1-2}$alkyl)carbonylamino (maximum of one), phenyl (maximum of one), benzoyl (maximum of one), benzylcarbonyl (maximum of one), phenylsulfonyl (maximum of one), tolylsulfonyl (maximum of one), sulfamoyl (maximum of one), C$_{1-2}$alkylsulfamoyl (maximum of one), di-(C$_{1-2}$alkyl)sulfamoyl (maximum of one), thiocyano (maximum of one), phenylazo or substituted phenylazo having 1 to 3 substituents each of which is independently chloro, bromo, methyl (maximum of two), C$_{1-2}$alkoxy (maximum of two), cyano (maximum of two), nitro (maximum of two) or phenyl (maximum of one) (maximum number of phenylazo and substituted phenylazo together is one); benzothiazolyl; substituted benzothiazolyl having 1 or 2 substitutents each of which is independently chloro, bromo, cyano, nitro, methyl (maximum of one), C$_{1-2}$alkylsulfonyl (maximum of one), sulfamoyl (maximum of one) or thiocyano (maximum of one); benzoisothiazolyl; substituted benzoisothiazolyl having 1 or 2 substituents each of which is independently chloro, bromo, cyano, nitro (maximum of one) or C$_{1-2}$alkylsulfonyl (maximum of one); thienyl; substituted thienyl having 1 to 3 substituents each of which is independently chloro (maximum of two), bromo (maximum of two), cyano (maximum of two), nitro (maximum of two), methyl (maximum of one), phenyl (maximum of one), C$_{1-3}$alkyl)carbonyl (maximum of one), hydroxy (maximum of one) or methoxycarbonyl (maximum of one); thiazolyl; substituted thiazolyl having 1 or 2 substituents each of which is independently chloro, bromo, cyano, methyl (maximum of one), nitro (maximum of one) or C$_{1-2}$alkylsulfonyl (maximum of one); 3-phenyl-1,2,4-thiadiazolyl-5 or 2-phenyl-1,3,4-thiadiazolyl-5, K' is 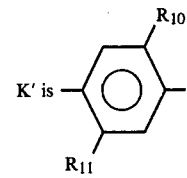

or 1,4-naphthylene, wherein:

R$_{10}$ is hydrogen, chloro, bromo, C$_{1-2}$alkyl, C$_{1-2}$alkoxy, 2-hydroxyethoxy, 2-methoxyethoxy or cyano(C$_{1-2}$alkoxy), and R$_{11}$ is hydrogen, chloro, bromo, C$_{1-2}$alkyl, C$_{1-2}$alkoxy, (C$_{1-4}$alkyl)carbonylamino, (C$_{1-2}$chloroalkyl)carbonylamino, (C$_{1-2}$bromoalkyl)carbonylamino, cyano, formamido, (C$_{1-2}$alkoxy) (C$_{1-4}$alkyl)carbonylamino, (C$_{1-4}$alkoxy)carbonylamino, phenoxy (C$_{1-2}$alkyl)carbonylamino, 2-(C$_{1-2}$alkoxy) (C$_{2-3}$alkoxy)carbonylamino, 3-(C$_{1-2}$alkoxy)propoxycarbonylamino, (C$_{1-4}$alkoxy)carbonyl (C$_{1-3}$alkyl)aminocarbonylamino, benzamido or phenyl(C$_{1-2}$)carbonylamino, R$_{11}$ being ortho to the —N═N— radical, R$_1$ is hydrogen; C$_{1-6}$alkyl; C$_{2-6}$alkenyl; C$_{2-6}$haloalkenyl; C$_{1-6}$alkyl monosubstituted by halo, hydroxy, C$_{1-6}$alkoxy, acyloxy, phenyl, phenoxy, cyano, C$_{2-6}$alkenyloxy, C$_{2-6}$alkynyloxy or (C$_{1-6}$alkoxy)C$_{2-6}$alkynyloxy; or C$_{1-6}$alkyl substituted by hydroxy and one further substituent selected from the group consisting of halo, hydroxy, C$_{1-6}$alkoxy, acyloxy, phenyl, phenoxy, cyano, C$_{2-6}$alkenyloxy, C$_{2-6}$alkynyloxy and (C$_{1-6}$alkoxy)C$_{2-6}$alkynyloxy, with the proviso that R$_1$ must be hydrogen, C$_{1-6}$alkyl or C$_{1-6}$alkenyl when K' is 1,4-naphthylene, R$_2$ is hydrogen, acyl, C$_{1-6}$alkyl or C$_{1-6}$alkyl monosubstituted by halo, C$_{1-6}$alkoxy, phenyl, phenoxy, benzyloxy, hydroxy or acyloxy, each of R$_3$ and R$_3'$ is independently hydrogen or C$_{1-6}$alkyl or R$_3$ and R$_3'$ taken together and with the carbon atom to which they are joined form a cyclohexyl ring, and R$_5$ is hydrogen or

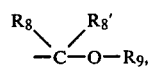

wherein each of

R$_8$ and R$_8'$ is independently hydrogen or C$_{1-6}$alkyl, and

R9 is hydrogen, acyl, C$_{1-6}$alkyl or C$_{1-6}$alkyl monosubstituted by C$_{1-6}$alkoxy, (C$_{1-6}$alkoxy)C$_{1-6}$alkoxy or acyloxy, with the proviso that R$_5$ must be hydrogen when R$_3$ and R$_3'$ taken together and with the carbon atom to which they are joined form a cyclohexyl ring, wherein each acyl and the acyl moiety of each acyloxy is independently R—O—CO—, R—SO$_2$—, R'—CO—, R'—NR''—CO— or R'—NR''—SO$_2$—, wherein R is C$_{1-6}$alkyl, C$_{1-6}$haloalkyl, 2-hydroxypropyl, 3-hydroxypropyl, 2,3-dihydroxypropyl, phenyl, tolyl or benzyl, and each of R' and R'' is independently hydrogen, C$_{1-6}$alkyl, C$_{1-6}$haloalkyl, 2-hydroxypropyl, 3-hydroxypropyl, 2,3-dihydroxypropyl, phenyl, tolyl or benzyl, and each halo is independently fluoro, chloro, bromo or iodo.

4. A compound according to claim 3 wherein

R$_1$ is hydrogen; C$_{1-4}$alkyl; C$_{2-4}$alkyl monosubstituted in the 2-, 3- or 4-position by chloro, bromo, hydroxy, C$_{1-2}$alkoxy, formyloxy, (C$_{1-4}$alkyl)carbonyloxy, (C$_{1-2}$alkoxy)carbonyloxy, (C$_{1-2}$alkyl)carbamoyloxy, phenoxy, phenyl, benzoyloxy or cyano; 2-hydroxy-3-chloropropyl; benzyl; allyl; 2- or 3-chloroallyl; 2- or 3-bromoallyl; 2-hydroxy-3-propargyloxypropyl or 2-hydroxy-3-(4-methoxybutyn-2-yloxy)propyl, with the proviso that R$_1$ must be hydrogen or C$_{1-4}$alkyl when K' is 1,4-naphthylene, R$_2$ is hydrogen; C$_{1-4}$alkyl; C$_{1-4}$chloroalkyl; C$_{1-4}$bromoalkyl; C$_{2-4}$alkyl monosubstituted in the 2-, 3- or 4-position by C$_{1-2}$alkoxy, hydroxy, phenoxy, formyloxy, (C$_{1-3}$alkyl)carbonyloxy or benzyloxy; (C$_{1-4}$alkyl)carbonyl; benzoyl or (C$_{1-4}$alkoxy)carbonyl, each of R$_3$ and R$_3'$ is independently hydrogen or methyl or R$_3$ and R$_3'$ taken together and with the carbon atom to which they are joined form a cyclohexyl ring, and R$_5$ is hydrogen, 1-(C$_{1-2}$alkoxy)C$_{1-3}$alkyl, (2-methoxyethoxy)methyl, acetoxymethyl or chloropropionyloxymethyl, with the proviso that R$_5$ must be hydrogen when R$_3$ and R$_3'$ taken together and with the carbon atom to which they are joined form a cyclohexyl ring.

5. A compound according to claim 3 wherein R$_1$ is hydrogen; C$_{1-4}$alkyl; C$_{2-4}$alkyl monosubstituted in the 2-, 3- or 4-position by chloro, bromo, hydroxy, C$_{1-2}$alkoxy, formyloxy, (C$_{1-4}$alkyl)carbonyloxy, (C$_{1-2}$alkoxy)carbonyloxy, (C$_{1-2}$alkyl)carbamoyloxy, phenoxy, phenyl, benzoyloxy or cyano; 2-hydroxy-3-chloropropyl; benzyl; allyl; 2- or 3-chloroallyl; 2- or 3-bromoallyl; 2-hydroxy-3-propargyloxypropyl or 2-hydroxy-3-(4-methoxybutyn-2-yloxy)propyl, with the proviso that R$_1$ must be hydrogen or C$_{1-4}$alkyl when K' is 1,4-naphthylene.

6. A compound according to claim 3 wherein R$_2$ is hydrogen; C$_{1-4}$alkyl; C$_{1-4}$chloroalkyl; C$_{1-4}$bromoalkyl; C$_{2-4}$alkyl monosubstituted in the 2-, 3- or 4-position by C$_{1-2}$alkoxy, hydroxy, phenoxy, formyloxy, (C$_{1-3}$alkyl)carbonyloxy or benzyloxy; (C$_{1-4}$alkyl)carbonyl; benzoyl or (C$_{1-4}$alkoxy)carbonyl.

7. A compound according to claim 3 wherein each of R$_3$ and R$_3'$ is independently hydrogen or methyl or R$_3$ and R$_3'$ taken together and with the carbon atom to which they are joined form a cyclohexyl ring.

8. A compound according to claim 3 wherein R$_5$ is hydrogen, 1-(C$_{1-2}$alkoxy)C$_{1-3}$alkyl, (2-methoxyethoxy)methyl, acetoxymethyl or chloropropionyloxymethyl.

9. A compound according to claim 3 wherein R$_{11}$ is hydrogen, chloro, bromo, C$_{1-2}$alkyl, C$_{1-2}$alkoxy, (C$_{1-4}$alkyl)carbonylamino, chloroethylcarbonylamino, bromoethylcarbonylamino, cyano, formamido, (C$_{1-2}$alkoxy) (C$_{1-4}$alkyl)carbonylamino, (C$_{1-4}$alkoxy)carbonylamino, phenoxy(C$_{1-2}$alkyl)carbonylamino, 2-(C$_{1-2}$alkoxy) (C$_{2-3}$alkoxy)carbonylamino, 3-(C$_{1-2}$alkoxy)-propoxycarbonylamino, (C$_{1-4}$alkoxy)carbonyl(C$_{1-3}$alkyl)aminocarbonylamino, benzamido or phenyl(C$_{1-2}$alkyl)carbonylamino, R$_{11}$ being ortho to the —N=N— radical.

10. A compound according to claim 2 having the formula

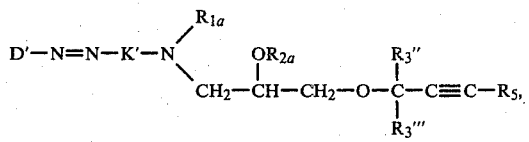

wherein

D' is phenyl; substituted phenyl having 1 to 4 substituents each of which is independently chloro, bromo, iodo (maximum of two), cyano (maximum of two), trifluoromethyl (maximum of two), C$_{1-2}$alkylsulfonyl (maximum of two), nitro (maximum of two), methyl (maximum of two), methoxy (maximum of two), formyl (maximum of one), (C$_{1-4}$alkyl)carbonyl (maximum of one), (C$_{1-2}$alkoxy)carbonyl (maximum of one), carbamoyl (maximum of one), (C$_{1-2}$alkyl)carbamoyl (maximum of one), di-(C$_{1-2}$alkyl)carbamoyl (maximum of one), phenylcarbamoyl (maximum of one), (C$_{1-2}$alkyl)carbonylamino (maximum of one), phenyl (maximum of one), benzoyl (maximum of one), benzylcarbonyl (maximum of one), phenylsulfonyl (maximum of one), tolylsulfonyl (maximum of one), sulfamoyl (maximum of one), C$_{1-2}$alkylsulfamoyl (maximum of one), di-(C$_{1-2}$alkyl)sulfamoyl (maximum of one), thiocyano (maximum of one), phenylazo or substituted phenylazo having 1 to 3 substituents each of which is independently chloro, bromo, methyl (maximum of two), C$_{1-2}$alkoxy (maximum of two), cyano (maximum of two), nitro (maximum of two) or phenyl (maximum of one) (maximum number of phenylazo and substituted phenylazo together is one); benzothiazolyl; substituted benzothiazolyl having 1 or 2 substituents each of which is independently chloro, bromo, cyano, nitro, methyl (maximum of one), C$_{1-2}$alkylsulfonyl (maximum of one), sulfamoyl (maximum of one) or thiocyano (maximum of one); benzoisothiazolyl; substituted benzoisothiazolyl having 1 or 2 substituents each of which is independently chloro, bromo, cyano, nitro (maximum of one) or C$_{1-2}$alkylsulfonyl (maximum of one); thienyl; substituted thienyl having 1 to 3 substituents each of which is independently chloro (maximum of two), bromo (maximum of two), cyano (maximum of two), nitro (maximum of two), methyl (maximum of one), phenyl (maximum of one), (C$_{1-3}$alkyl)carbonyl (maximum of one), hydroxy (maximum of one) or methoxycarbonyl (maximum of one); thiazolyl; substituted thiazolyl having 1 or 2 substituents each of which is independently chloro, bromo, cyano, methyl (maximum of one), nitro (maximum of one) or $C_{1-2}$alkylsulfonyl (maximum of one); 3-phenyl-1,2,4-thiadiazolyl-5 or 2-phenyl-1,3,4-thiadiazolyl-5, K' is 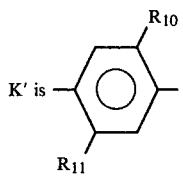

or 1,4-naphthylene, wherein $R_{10}$ is hydrogen, chloro, bromo, $C_{1-2}$alkyl, $C_{1-2}$alkoxy, 2-hydroxyethoxy, 2-methoxyethoxy or cyano($C_{1-2}$alkoxy), and $R_{11}$ is hydrogen, chloro, bromo, $C_{1-2}$alkyl, $C_{1-2}$alkoxy, ($C_{1-4}$alkyl)carbonylamino, ($C_{1-2}$chloroalkyl)carbonylamino, ($C_{1-2}$bromoalkyl)carbonylamino, cyano, formamido, ($C_{1-2}$alkoxy)($C_{1-4}$alkyl)carbonylamino, ($C_{1-4}$alkoxy)carbonylamino, phenoxy($C_{1-2}$alkyl)carbonylamino, 2-($C_{1-2}$alkoxy)($C_{2-3}$alkoxy)carbonylamino, 3-($C_{1-2}$alkoxy)propoxycarbonylamino, ($C_{1-4}$alkoxy)carbonyl($C_{1-3}$alkyl)aminocarbonylamino, benzamido or phenyl($C_{1-2}$alkyl)carbonylamino, $R_{11}$ being ortho to the -N=N- radical, $R_{1a}$ is hydrogen; $C_{2-4}$alkyl; $C_{2-4}$alkenyl; $C_{2-4}$alkyl monosubstituted by halo, hydroxy, $C_{1-4}$alkoxy, acyloxy, phenyl, phenoxy, cyano, $C_{2-6}$alkynyloxy or ($C_{1-6}$alkoxy)$C_{2-6}$alkynyloxy; or $C_{2-4}$alkyl substituted by hydroxy and one further substituent selected from the group consisting of halo, hydroxy, $C_{1-4}$alkoxy, acyloxy, phenyl, phenoxy, cyano, $C_{2-6}$alkynyloxy or ($C_{1-6}$alkoxy)$C_{2-6}$alkynyloxy, with the provisos that $R_{1a}$ may be $C_{2-4}$alkenyl only when K' is 1,4-naphthylene and $R_{1a}$ must be hydrogen, $C_{2-4}$alkyl or $C_{2-4}$alkenyl when K' is 1,4-naphthylene, $R_{2a}$ is hydrogen, acyl, $C_{1-6}$alkyl or $C_{1-6}$alkyl monosubstituted by halo, $C_{1-4}$alkoxy, phenoxy, phenyl, benzyloxy or acyloxy, each of $R_3''$ and $R_3'''$ is independently hydrogen or $C_{1-4}$alkyl or $R_3''$ and $R_3'''$ taken together and with the carbon atom to which they are joined form a cyclohexyl ring, and $R_5$ is hydrogen or

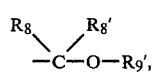

wherein each of $R_8$ and $R_8'$ is independently hydrogen or $C_{1-6}$alkyl, and $R_9'$ is hydrogen, acyl, $C_{1-6}$alkyl or $C_{1-6}$alkyl monosubstituted by $C_{1-6}$alkoxy, acyloxy or ($C_{1-4}$alkoxy)$C_{2-4}$alkoxy, with the proviso that $R_5$ must be hydrogen when $R_3''$ and $R_3'''$ taken together and with the carbon atom to which they are joined form a cyclohexyl ring, wherein each acyl and the acyl moiety of each acyloxy is independently R—O—CO—, R—SO$_2$—, R'—CO—, R'—NR''—CO— or R'—NR''—SO$_2$—, wherein R is $C_{1-6}$alkyl, $C_{1-6}$haloalkyl, 2-hydroxypropyl, 3-hydroxypropyl, 2,3-dihydroxypropyl, phenyl, tolyl or benzyl, and each of R' and R'' is independently hydrogen, $C_{1-6}$alkyl, $C_{1-6}$haloalkyl, 2-hydroxypropyl, 3-hydroxypropyl, 2,3-dihydroxypropyl, phenyl, tolyl or benzyl, and each halo is independently fluoro, chloro, bromo or iodo.

11. A compound according to claim 9 wherein $R_2$ is hydrogen, $C_{1-6}$alkyl or $C_{1-6}$alkyl monosubstituted by halo, $C_{1-6}$alkoxy, phenyl, phenoxy, benzyloxy, hydroxy or acyloxy.

12. A compound according to claim 9 wherein D' is phenyl or substituted phenyl having 1 to 4 substituents.

13. A compound according to claim 12 wherein D' is phenyl or substituted phenyl having 1 to 3 substituents.

14. A compound according to claim 13 wherein D' is phenyl or substituted phenyl having 1 to 3 substituents each of which is independently chloro (maximum of two), bromo (maximum of two), iodo (maximum of two), nitro (maximum of two), cyano (maximum of two), $C_{1-2}$alkylsulfonyl (maximum of two), ($C_{1-2}$alkoxy)carbonyl (maximum of one), sulfamoyl (maximum of one) or di-($C_{1-2}$alkyl)sulfamoyl (maximum of one).

15. A compound according to claim 14 wherein D' is

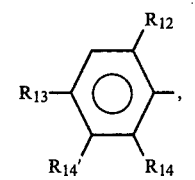

wherein $R_{12}$ is hydrogen, chloro, bromo, iodo, nitro, cyano, $C_{1-2}$alkylsulfonyl or ($C_{1-2}$alkoxy)carbonyl, $R_{13}$ is nitro, sulfamoyl or di-($C_{1-2}$alkyl)sulfamoyl, $R_{14}$ is hydrogen, chloro, bromo, iodo, cyano or $C_{1-2}$alkylsulfonyl, and $R_{14}'$ is hydrogen, chloro or bromo, with the proviso that at least one of $R_{14}$ and $R_{14}'$ is hydrogen.

16. A compound according to claim 15 wherein $R_1$ is hydrogen, $C_{1-2}$alkyl or $C_{2-3}$alkyl monosubstituted in the 2- or 3-position by ($C_{1-2}$alkyl)carbonyloxy or cyano, with the proviso that $R_1$ must be hydrogen or $C_{1-2}$alkyl when K' is 1,4-naphthylene, P1 $R_2$ is hydrogen or $C_{1-4}$alkyl, and each of $R_3$ and $R_3'$ is independently hydrogen or methyl.

17. A compound according to claim 16 wherein $R_3$ is hydrogen, and $R_3'$ is hydrogen.

18. A compound according to claim 16 wherein $R_5$ is hydrogen, (2-methoxyethoxy)methyl or acetoxymethyl.

19. A compound according to claim 15 wherein $R_{12}$ is nitro or cyano, $R_{13}$ is nitro, $R_{14}$ is chloro, bromo, cyano or methylsulfonyl, and $R_{14}'$ is hydrogen.

20. A compound according to claim 19 wherein $R_1$ is hydrogen, $R_2$ is hydrogen, and wherein R₅" is hydrogen, (2-methoxyethoxy)-methyl or acetoxymethyl.

21. A compound according to claim 3 having the formula

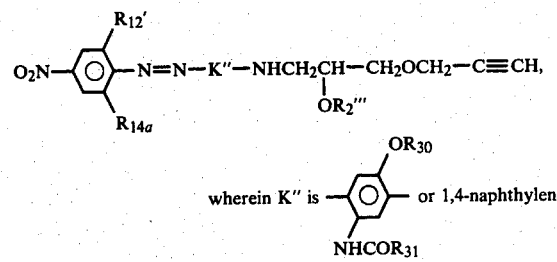

wherein K" is 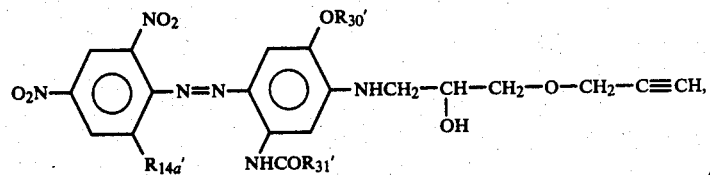 or 1,4-naphthylene, wherein
R₃₀ is C₁₋₂alkyl, 2-methoxyethyl or 2-hydroxyethyl, and
R₃₁ is hydrogen, C₁₋₂alkyl, chloromethyl, (C₁₋₂alkoxy)C₁₋₄alkyl or C₁₋₄alkoxy,
R₂''' is hydrogen or acetyl,
R₁₂' is nitro or cyano, and
R₁₄ₐ is chloro, bromo, iodo, cyano or methylsulfonyl.

22. A compound according to claim 21 having the formula

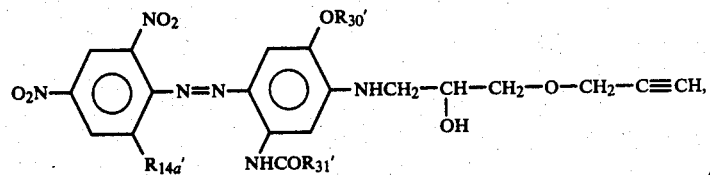

wherein
R₁₄ₐ' is chloro, bromo or iodo,
R₃₀' is methyl or ethyl, and
R₃₁' is methyl or ethyl.

23. The compound according to claim 22 having the formula

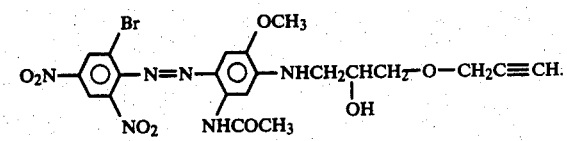

24. The compound according to claim 21 having the formula

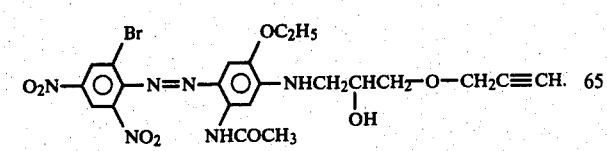

25. The compound according to claim 19 having the formula

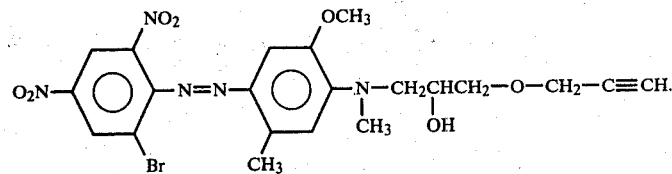

26. The compound according to claim 21 having the formula

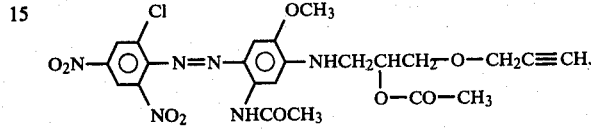

27. The compound according to claim 20 having the formula

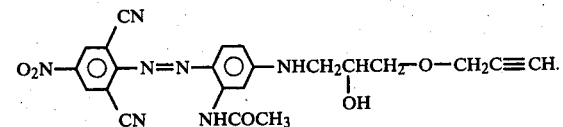

28. The compound according to claim 21 having the formula

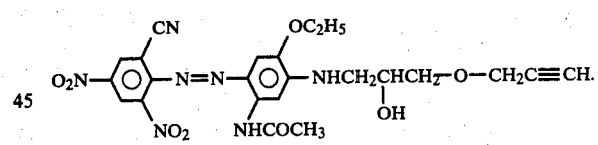

29. The compound according to claim 21 having the formula

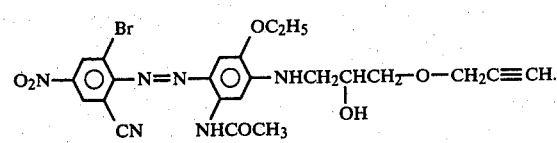

30. The compound according to claim 21 having the formula

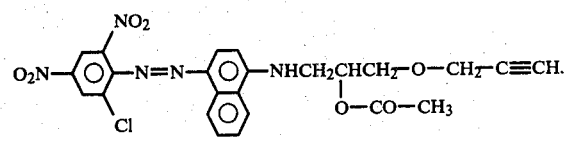

31. The compound according to claim 21, having the formula

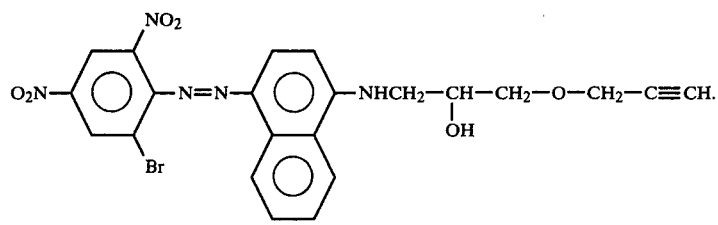
* * * * *